United States Patent
Bedros et al.

(10) Patent No.: US 8,634,596 B2
(45) Date of Patent: Jan. 21, 2014

(54) THREE-DIMENSIONAL MULTILAYER SKIN TEXTURE RECOGNITION SYSTEM AND METHOD

(75) Inventors: Saad J. Bedros, West St Paul, MN (US); Kwong Wing Au, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 434 days.

(21) Appl. No.: 12/972,829

(22) Filed: Dec. 20, 2010

(65) Prior Publication Data
US 2011/0150322 A1    Jun. 23, 2011

Related U.S. Application Data

(60) Provisional application No. 61/289,019, filed on Dec. 22, 2009.

(51) Int. Cl.
*G06K 9/00* (2006.01)
*G06K 9/46* (2006.01)
*G06K 9/66* (2006.01)
*G06K 9/52* (2006.01)

(52) U.S. Cl.
USPC ............ 382/115; 382/154; 382/195; 382/206

(58) Field of Classification Search
None
See application file for complete search history.

(56) References Cited

U.S. PATENT DOCUMENTS

| | | | |
|---|---|---|---|
| 6,571,003 B1 | 5/2003 | Hillebrand et al. | |
| 6,640,130 B1 | 10/2003 | Freeman et al. | |
| 7,199,348 B2 | 4/2007 | Olsen et al. | |
| 7,469,060 B2* | 12/2008 | Bazakos et al. | 382/173 |
| 2003/0179931 A1 | 9/2003 | Sun | |
| 2004/0236229 A1 | 11/2004 | Freeman et al. | |
| 2005/0226471 A1 | 10/2005 | Singh et al. | |
| 2005/0270528 A1 | 12/2005 | Geshwind et al. | |
| 2006/0050933 A1* | 3/2006 | Adam et al. | 382/118 |
| 2007/0172099 A1 | 7/2007 | Park et al. | |
| 2008/0025579 A1 | 1/2008 | Sidlauskas et al. | |
| 2008/0025580 A1 | 1/2008 | Sidlauskas et al. | |
| 2010/0189313 A1* | 7/2010 | Prokoski | 382/118 |

OTHER PUBLICATIONS

Philips et al, Face Recognition Vendor Test, 2002, NISTIR 6965, pp. 1-56.*
Gritti et al, Local Features based Facial Expression Recognition with Face Registration Errors, 2008, IEEE, pp. 1-8.*
Al Abbadi, N. K. et al., "Skin Texture Recognition Using Neural Networks," IT Research and Development Center, Kufa University, Najaf- Iraq, http://eref.ugu.edu.sa/files/eref2/folder6/f39.pdf.

* cited by examiner

*Primary Examiner* — Bhavesh Mehta
*Assistant Examiner* — David F Dunphy
(74) *Attorney, Agent, or Firm* — Kermit D. Lopez; Luis M. Ortiz; Ortiz & Lopez, PLLC

(57) ABSTRACT

A three-dimensional multilayer skin texture recognition system and method based on hyperspectral imaging. Three-dimensional facial model associated with an object may be acquired from a three-dimensional image capturing device. A face reconstruction approach may be implemented to reconstruct and rewarp the three-dimensional facial model to a frontal face image. A hyperspectral imager may be employed to extract a micro structure skin signature associated with the skin surface. The micro structure skin signature may be characterized utilizing a weighted subtraction of reflectance at different wavelengths that captures different layers under the skin surface via a multilayer skin texture recognition module. The volumetric skin data associated with the face skin can be classified via a volumetric pattern.

12 Claims, 4 Drawing Sheets

US 8,634,596 B2

THREE-DIMENSIONAL MULTILAYER SKIN TEXTURE RECOGNITION SYSTEM AND METHOD

CROSS-REFERENCE TO NON-PROVISIONAL PATENT APPLICATION

This application is related to and claims priority to U.S. Provisional Patent Application No. 61/289,019, filed Dec. 22, 2009, and entitled "Three-Dimensional Multilayer Skin Texture Recognition System and Method," the contents of which are hereby incorporated herein by reference in their entirety.

TECHNICAL FIELD

Embodiments are generally related to image processing systems and methods. Embodiments are also related to face recognition techniques. Embodiments are additionally related to multilayer skin texture recognition methods and systems.

BACKGROUND OF THE INVENTION

Face detection based on skin texture recognition may be employed in a variety of applications including biometrics, surveillance and access control, realistic rendering for computer graphics, robust face models for computer vision, computer-assisted diagnosis for dermatology, and so forth. Quantitative characterization of skin appearance is an important, but difficult task. The skin surface is a detailed landscape, with complex geometry and local optical properties. Additionally, skin features depend on many variables such as body location (e.g., forehead, cheek), object parameters (e.g., age, gender), and imaging parameters (e.g., lighting, camera). The skin appearance may be strongly affected by the direction from which it is viewed and illuminated.

Facial features may be measured at a distance and without cooperation or knowledge of an individual. Conventional face recognition techniques often utilize a two-dimensional image (e.g. digital photographs) of a face acquired in uncontrolled environments to create a three-dimensional representation of the face. One of the problems with such techniques stems from the illumination and pose variations of the face, which can distort the projection of a three-dimensional face on a resulting two-dimensional image. Illumination variation may affect correlation based associated with image comparison, as the pixel values vary with varying illumination. Pose variation occurs as the projection in the image may change dramatically as the object rotates. Unfortunately, such prior art face recognition techniques are neither reliable nor accurate enough for arbitrary lighting and applications in unconstrained environments. Image variations due to such factors rendering the face detection and recognition tasks are more difficult.

Based on the foregoing, it is believed that a need exists for an improved three-dimensional multilayer skin texture recognition technology. A need also exists for extracting skin signature to detect faces irrespective of illuminations, facial poses, orientations, and facial expressions, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image-processing system and method.

It is another aspect of the disclosed embodiments to provide for an improved three-dimensional multilayer skin texture recognition system and method.

It is a further aspect of the disclosed embodiments to provide for an improved hyperspectral imager in association with a three-dimensional face shape capture for extracting skin signature to detect faces irrespective of illuminations, facial pose, orientation, and facial expressions.

The aforementioned aspects and other objectives and advantages can now be achieved as described herein. A three-dimensional multilayer skin texture recognition system and method based on hyperspectral imaging is disclosed. Three-dimensional facial model associated with an object, (e.g., a face) may be acquired from a three-dimensional image capturing device (e.g., camera). A face reconstruction approach may be implemented to reconstruct and rewarp the three-dimensional facial model to a frontal face image. A hyperspectral imager may be employed to extract a micro structure skin signature associated with the skin surface. The micro structure skin signature may be characterized utilizing a weighted subtraction of reflectance at different wavelengths that captures different layers under the skin surface via a multilayer skin texture recognition module. The volumetric skin data associated with the face skin can be classified via a volumetric pattern. Such an approach may be employed to distinguish and identify the object in a scene and perform an operation based on identified features, such as image manipulation.

The volumetric pattern may include a local binary pattern (LBP) or a local ternary pattern (LTP) for volumetric skin data classification. The multilayer skin texture recognition module may be employed for locating skin areas in the face suitable for skin texture analysis, warping, aligning, and normalizing the located skin areas, and extracting skin characteristics from the located skin areas. The obtained skin characteristics may be compared with skin characteristics of a reference image stored in a database associated with an image recognition unit. Such an approach provides an efficient and accurate non-cooperative face recognition that is robust to facial expressions in a variety of applications based on the skin texture analysis with higher accuracy.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed embodiments relate to multilayer skin texture recognition, which characterizes the micro structure signature of the face skin and can be constructed utilizing a weighted subtraction of the reflectance at different wavelengths in order to capture the different layers under the surface skin. Volumetric LBP or LTP can be employed to classify the volumetric skin data. Thus, as indicate herein, an algorithm and computer-implementable instructions thereof can be constructed, which is capable of recognizing individuals using multi layer skin texture for non-cooperative recognition. Such an approach is an attractive solution, for example, for homeland security applications because it is not intrusive. The disclosed embodiments further involve capturing 3D face geometry. Face reconstruction can then be achieved with rewarping applications with respect to frontal views to provide more robust results for hyperspectral skin texture recognition. In such an approach, a 3D image can be employed for non-cooperative face recognition applications.

Figure 1:
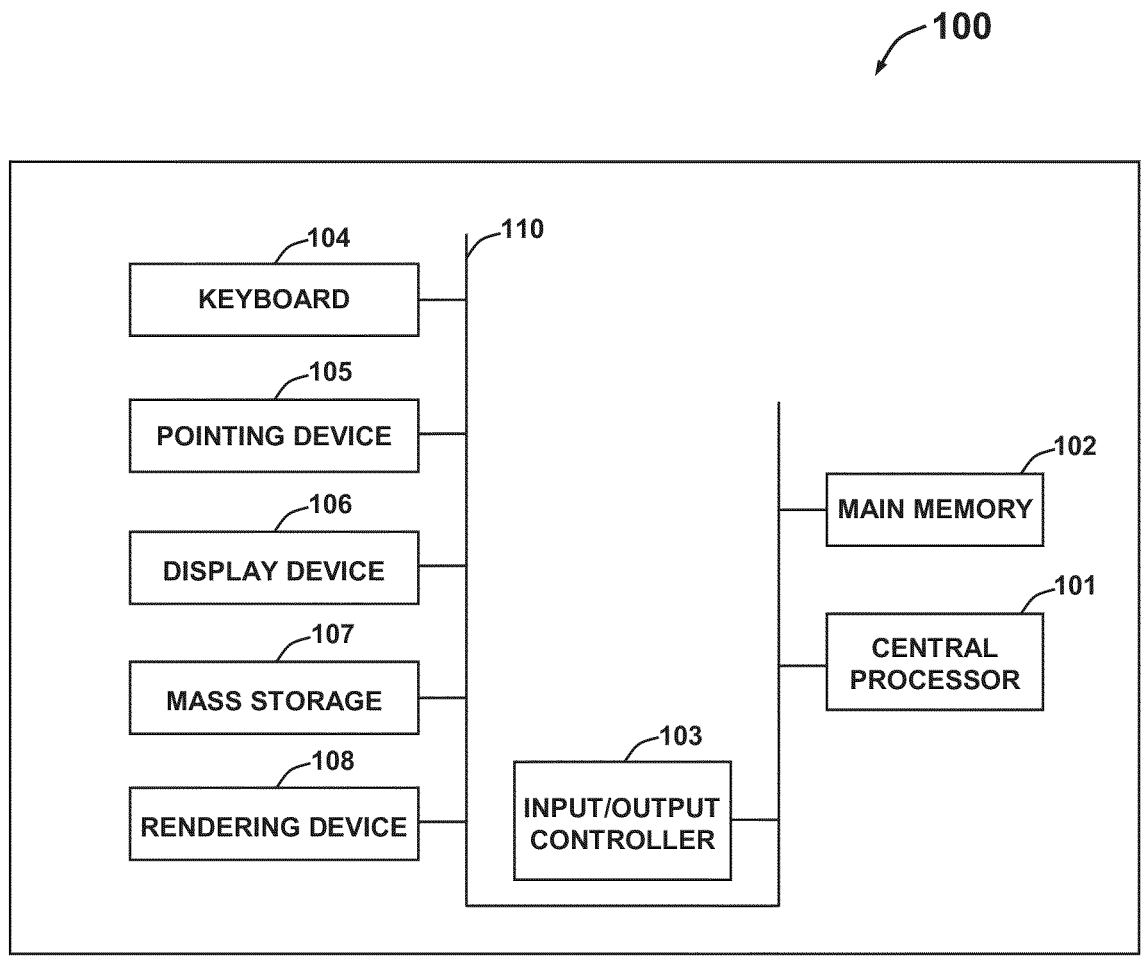
FIG. 1 illustrates a schematic view of a data-processing system in which an embodiment may be implemented.
Figure 2:
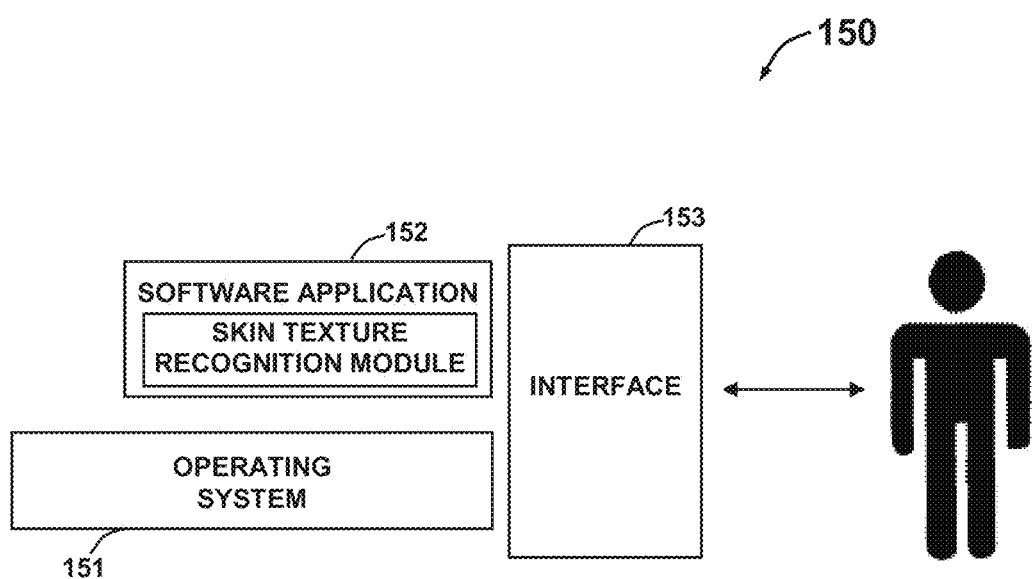
FIG. 2 illustrates a schematic view of a software system including an operating system, application software, and a user interface for carrying out an embodiment.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, fax machine, etc), for example, may communicate with the data-processing system 100 or may be integrated with the system 100 as desired. As illustrated, the various components of data-processing system 100 communicate electronically through a system bus 110 or a similar architecture. The system bus 110 may be implemented as a subsystem that transfers data between, for example, computer components within data-processing system 100 or between other data-processing devices, components, computers, etc.

FIG. 2 illustrates a computer software system 150 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/ or application module 152.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 152 can include a skin texture recognition module for extracting three-dimensional multilayer skin texture based on hyperspectral imaging to detect faces irrespective of illuminations and facial pose. The skin texture recognition module may be employed for recognizing an individual utilizing the multilayer skin texture. Software application module 152, on the other hand, can include instructions such as the various operations described herein with respect to the various components and modules described herein such as, for example, the method 400 depicted in FIG. 4.

The description herein is presented with respect to particular embodiments of the present invention, which may be embodied in the context of a data-processing system such as, for example, data-processing system 100 and computer software system 150 illustrated with respect to FIGS. 1-2. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 3:
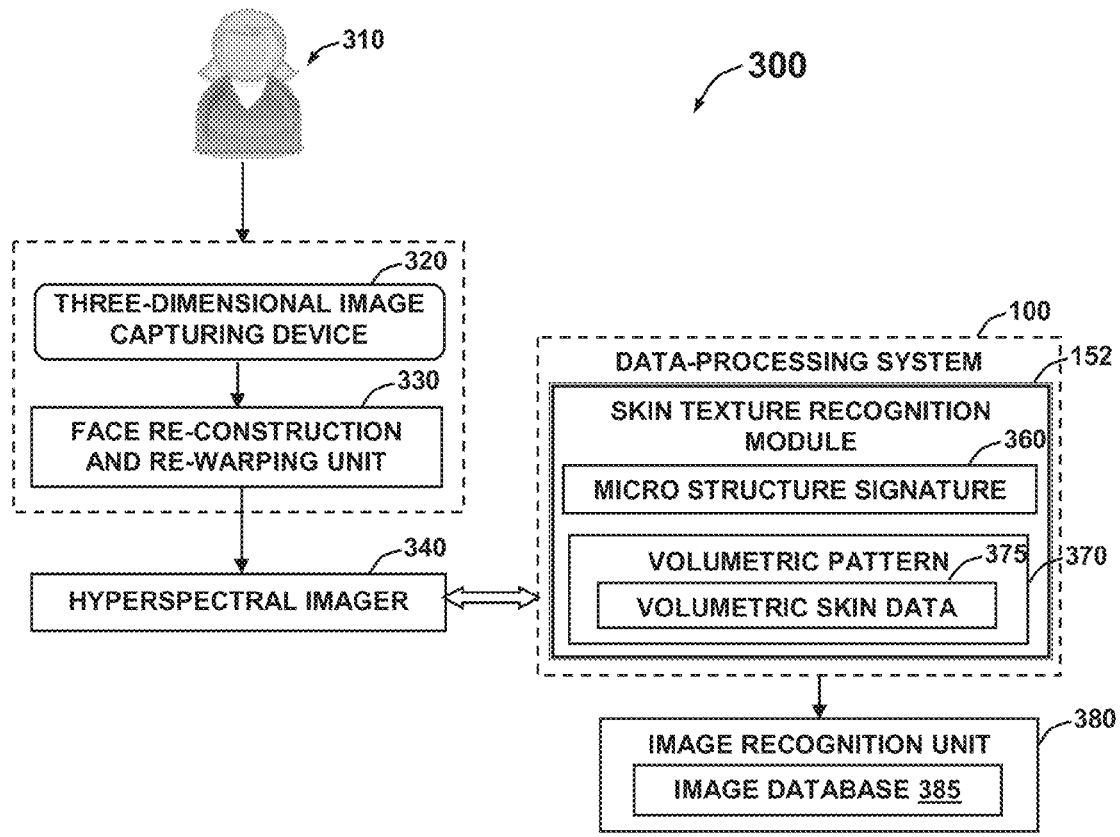
FIG. 3 illustrates a block diagram of a three-dimensional multilayer skin texture recognition system, in accordance with the disclosed embodiments.

FIG. 3 illustrates a block diagram of a three-dimensional multilayer skin texture recognition system 300, in accordance with the disclosed embodiments. Note that in FIGS. 1-4, identical or similar parts are generally indicated by identical reference numerals. The three-dimensional multilayer skin texture recognition system 300 may be employed in association with various image-based recognition systems for identifying an object (e.g., a face) within an environment. Face recognition based on image analysis possess a wide range of applications in a number of areas such as, for example, security, surveillance, virtual reality, and human-computer interaction. The facial recognition can be done from a distance even without cooperation or knowledge of an individual being scanned.

The disclosed embodiments may be employed to determine three-dimensional information with respect to the object 310. Although the disclosed embodiment is described with reference to the three-dimensional reconstruction and hyperspectral skin texture recognition, it should be understood that such techniques may be employed to reconstruct and recognize multiple views of any object. When used for faces, the three-dimensional information produced by the techniques disclosed herein can be employed for any face based application such as face recognition, face identification, face tracking, expression recognition, and content based image retrieval. The embodiments disclosed herein may be able to detect faces irrespective of illuminations, shadows, cluttered backgrounds, facial pose, orientation, and facial expressions.

The skin texture recognition system 300 may include a three-dimensional image capturing device 320 associated with a hyperspectral imager 340, a skin texture recognition module 152, and an image recognition unit 380. The three-dimensional image capturing device 320 described herein may be, for example, a digital camera, a camcorder or an electronic device with video capturing capabilities, depending upon design considerations. The image capturing device 320 captures three-dimensional images of a reflection associated with the object 310 moving at high speed. The object 310 may be positioned near the image capturing device 320 or may be positioned at a large stand-off distance from the image capturing device 320. The exemplary object to be detected in the illustrative image may be a human face. Those skilled in the art will appreciate that any image can be processed to detect and recognize the object 310 utilizing multilayer skin texture for non-cooperative recognition. The system 300 processes those images to extract the spatial geometry data needed to construct a three-dimensional model and texture data.

The three-dimensional facial geometry from a sequence of facial images may be acquired from the object 310 moving through the field of view of the image capturing device 320. The three-dimensional face geometry may then be selected for a reconstruction process via a face re-construction and re-warping unit 330. The face re-construction and re-warping unit 330 may be employed to reconstruct and rewarp the three-dimensional facial geometry to a frontal face image. The reconstruction unit 330 reconstructs the three-dimensional image on the basis of a result identified from a plurality of projected images from different projections by the image capturing device 320.

The hyperspectral imager 340 associated with the image capturing device 320 may be employed to extract micro structure skin signature 360 associated with a face skin surface of the object 310 that is robust to pose variations. The hyperspectral imager 340 utilizes three-dimensional sensors to capture information regarding the shape of the face. The information may then be employed to identify distinctive features on the face such as the contour of eye sockets, nose, and chin. Such an approach is called skin texture analysis, which turns the unique lines, patterns, and spots apparent in a person's skin into a mathematical space. Hyperspectral imager 340 captures hundreds of narrow spectral bands to enhance the detection of skin signature. The three-dimensional facial recognition is not affected by changes in lighting and can identify a face from a variety of angles, including profile view. The high-resolution hyperspectral imager 340 provides an abundance of spectral data for feature analysis in image processing.

The micro structure signature 360 associated with the face skin surface can be characterized using a weighted subtraction of the reflectance at different wavelengths that captures the different layers under the surface skin via multilayer skin texture recognition module 152. The skin texture recognition module 152 may be a software application that includes computer executable instructions executed by the data-processing system 100 or other computing system environment. The skin texture recognition module 152 may run as a stand-alone digital video tool, an embedded function or may be incorporated into other available digital image/video applications to provide enhanced functionality.

The volumetric skin data 375 associated with the face skin can be classified via a volumetric pattern 370. The volumetric pattern 370 may include a volumetric local binary pattern (LBP) texture analysis operator or a volumetric local ternary pattern (LTP) texture analysis operator for extracting the volumetric skin data 375. The volumetric pattern 370 may divide the face image into several blocks (e.g. facial regions) from which the local binary or ternary patterns may be extracted and constructed as a global feature histogram that represents both the statistics of the facial micro-patterns and the spatial locations. The volumetric pattern 370 may be utilized to measure a gray-scale invariant texture that is derived from a general definition of texture in a local neighborhood.

The volumetric skin data 375 in association with the micro structure skin signature 360 may provide an accurate identification of the object 310. The processed image may then be sent to the image recognition unit 380 which is associated with a three-dimensional image database 385. The obtained skin characteristics of the face may be compared with skin characteristics of a reference image stored in the database 385 associated with the image recognition unit 380 to identify the object 310. The multi layer skin texture recognition system 300 identifies each person in a target region from among the database 385 of recent users that is based upon identified features such as image manipulation. The system 300 may be employed in a variety of security applications based on the skin texture analysis. The hyperspectral imager 340 with three-dimensional face shape capture 310 can extract skin signature of objects of interest in a scene that is robust to pose variations for non-cooperative face recognition.

Figure 4:
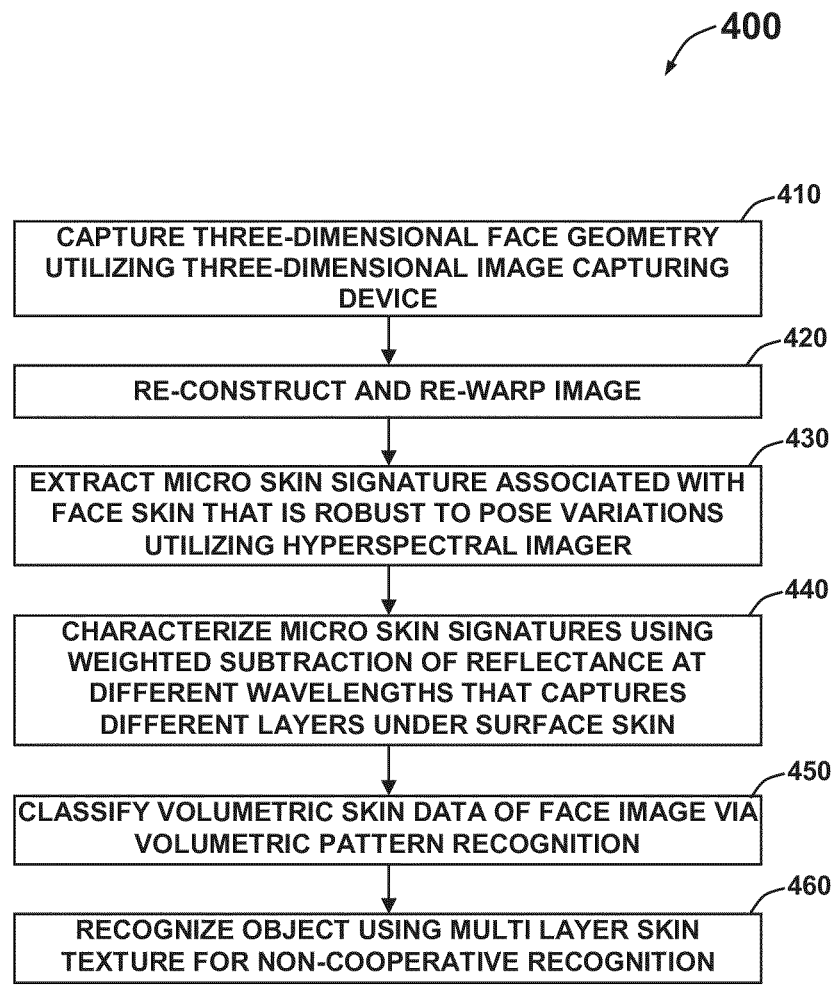
FIG. 4 illustrates a high level flow chart of operation illustrating logical operational steps of a method for extracting three-dimensional multilayer skin texture based on hyperspectral imaging, in accordance with the disclosed embodiments.

FIG. 4 illustrates a high level flow chart of operation illustrating logical operational steps of a method 400 for extracting three-dimensional multilayer skin texture based on hyperspectral imaging, in accordance with the disclosed embodiments. Note that the method 400 can be implemented in the context of a computer-useable medium that contains a program product. The method 400 may be implemented in the context of a computer-usable medium containing a program product (e.g., software application, software modules, etc).

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, other networked systems. Thus, the method 400 described herein can be deployed as process software in the context of a computer system or data-processing system as that depicted in FIGS. 1-2.

The three-dimensional facial model associated with the object 310 may be acquired from the three-dimensional image capturing device 320, as indicated at block 410. The face reconstruction approach may be implemented to reconstruct and rewarp the three-dimensional facial model to a frontal face image, as illustrated at block 420. The hyperspectral imager 340 may be employed to extract the micro structure skin signature 360 associated with the face skin that is robust to pose variations, as depicted at block 430. The skin signature 360 may be characterized utilizing a weighted subtraction of reflectance at different wavelengths that captures different layers under a face skin surface associated with the object 310 via a multilayer skin texture recognition module 152, as indicated at block 440. The volumetric skin data 375 associated with the face skin can be classified via the volumetric pattern 370, as illustrated at block 450. The object 310 may be recognized utilizing the multilayer skin texture for non-cooperative recognition, as indicated at block 460.

The multilayer skin texture recognition module 152 may be employed for locating skin areas in the face suitable for skin texture analysis, warping, aligning, and normalizing the located skin areas, and extracting skin characteristics from the located skin areas. The obtained skin characteristics may be compared with skin characteristics of a reference image stored in the database 385 associated with an image recognition unit 380. Such an approach provides an efficient and accurate non-cooperative face recognition that is robust to facial expressions in a variety of applications based on the skin texture analysis with higher accuracy. The disclosed embodiment may be employed in association with face recognition systems for different applications (e.g. biometrics, information security, law enforcement, smart cards, access control, and so on) and for determining and/or identifying objects for security reasons and military purposes.

Based on the foregoing, it can be appreciated that in an embodiment, a method is disclosed for recognizing three-dimensional multilayer skin texture. Such a method can include, for example, acquiring a three-dimensional facial model with respect to an object via a three-dimensional image capturing device in order to thereafter re-construct and re-warp the three-dimensional facial model into a frontal face image; extracting a micro structure skin signature with respect to a skin surface associated with the object via an imager; and computing a weighted subtraction of reflectance with respect to a different wavelength in order to capture a plurality of layers beneath the skin surface so as to characterize the micro structure skin signature for a non-cooperative recognition.

In another embodiment of such a method, the imager can be, for example, but not limited to, a hyperspectral imaging device. In an alternative embodiment of such a method, a step can be implemented for classifying volumetric skin data associated with the skin surface via a volumetric pattern. Additionally, in accordance with another embodiment of such a method, a step can be implemented for comparing the micro structure signature associated with the skin surface to a plurality of facial measurements stored in a database. In a further variation to such an embodiment, a step can be performed for recognizing the object based on the micro structure signature associated the skin surface.

Additionally, in another embodiment of such a method, the disclosed three-dimensional facial model can include the use of data indicative of a color associated with the skin surface. Such a three dimensional facial model can also include the use of data indicative of a texture associated with the skin surface. Additionally, the disclosed volumetric pattern can constitute a volumetric local binary pattern. In an alternative embodiment, the volumetric pattern may also comprise a volumetric local ternary pattern.

It can also be appreciated that based on the foregoing, in another embodiment, a system is disclosed for recognizing three-dimensional multilayer skin texture. Such a system can include a processor and a data bus coupled to the processor. Such a system may further include a computer-usable medium embodying computer code. The computer-usable medium is generally coupled to the data bus and the computer program code includes instructions executable by the processor and configured for: acquiring a three-dimensional facial model with respect to an object via a three-dimensional image capturing device in order to thereafter re-construct and re-warp the three-dimensional facial model into a frontal face image; extracting a micro structure skin signature with respect to a skin surface associated with the object via an imager; and computing a weighted subtraction of reflectance with respect to a different wavelength in order to capture a plurality of layers beneath the skin surface so as to characterize the micro structure skin signature for a non-cooperative recognition.

It will be appreciated that variations of the above disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for recognizing three-dimensional multilayer skin texture, said method comprising:
   acquiring a three-dimensional facial model with respect to an object via a three-dimensional image capturing device in order to thereafter re-construct said three-dimensional image on a basis of a result identified from a plurality of projected images from different projections by said three-dimensional image capturing device and re-warp said three-dimensional facial model into a frontal face image;
   extracting via a skin texture recognition module, a micro structure skin signature with respect to a skin surface associated with said object via an hyperspectral imager;
   computing a weighted subtraction of reflectance with respect to a different wavelength in order to capture a plurality of layers beneath said skin surface so as to characterize said micro structure skin signature for a non-cooperative recognition;
   classifying volumetric skin data associated with said skin surface via a volumetric pattern; and
   wherein said volumetric pattern comprises a volumetric local binary pattern that is extracted and constructed as a global feature histogram that represents statistics of a facial micro-pattern and spatial locations and wherein said volumetric pattern is employed for measuring a gray-scale invariant texture that is derived from a general definition of texture in a local neighborhood.

2. The method of claim 1 wherein said hyperspectral imager captures a plurality of spectral bands to enhance detection of said micro structure skin signature.

3. The method of claim 2 further comprising comparing said micro structure signature associated said skin surface to a plurality of facial measurements stored in a database.

4. The method of claim 3 further comprising recognizing said object based on said micro structure signature associated with said skin surface.

5. The method of claim 4 wherein said volumetric pattern comprises a volumetric local ternary pattern.

6. The method of claim 3 wherein said three-dimensional facial model includes data indicative of a color associated with said skin surface.

7. The method of claim 3 wherein said three-dimensional facial model includes data indicative of a multilayer skin texture associated with said skin.

8. A system for recognizing three-dimensional multilayer skin texture, said system comprising:
- a three-dimensional image capturing device for acquiring a three-dimensional facial model with respect to an object in order to thereafter re-construct said three-dimensional image on a basis of a result identified from a plurality of projected images from different projections by said three-dimensional image capturing device and re-warp said three-dimensional facial model into a frontal face image;
- a hyperspectral imaging device for extracting a micro structure skin signature with respect to a skin surface associated with said object via an imager, wherein said hyperspectral imaging device communicates with said three-dimensional image capture device;
- a processor for computing a weighted subtraction of reflectance with respect to a different wavelength in order to capture a plurality of layers beneath said skin surface so as to characterize said micro structure skin signature for a non-cooperative recognition, wherein said processor communicates with said hyperspectral imaging device and said three-dimensional image capturing device;
- wherein said hyperspectral imaging device captures a plurality of spectral bands to enhance detection of said micro structure skin signature;
- wherein said processor classifies volumetric skin data associated with said skin surface via a volumetric pattern;
- wherein said instructions are further configured for comparing said micro structure signature associated with said skin surface to a plurality of facial measurements stored in a database; and
- wherein said three-dimensional facial model includes data indicative of a multilayer skin texture associated with said skin.

9. The system of claim 8 wherein said instructions are further configured for recognizing said object based on said micro structure signature associated with said skin surface.

10. The system of claim 8 wherein said three-dimensional facial model includes data indicative of a color associated with said skin surface.

11. The system of claim 8 wherein said volumetric pattern comprises a volumetric local binary pattern that is extracted and constructed as a global feature histogram that represents statistics of a facial micro-pattern and spatial locations and wherein said volumetric pattern is employed for measuring a gray-scale invariant texture that is derived from a general definition of texture in a local neighborhood.

12. The system of claim 8 wherein said volumetric pattern comprises a volumetric local ternary pattern.

* * * * *